(12) United States Patent
Erhart et al.

(10) Patent No.: US 10,773,801 B2
(45) Date of Patent: *Sep. 15, 2020

(54) CONTROLLABLE FLIGHT DURING AUTOMATED TRICKS

(71) Applicant: TRAXXAS LP, McKinney, TX (US)

(72) Inventors: Wesley Ronald Erhart, McKinney, TX (US); Thomas Michael Kawamura, Plano, TX (US)

(73) Assignee: TRAXXAS LP, McKinney, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/657,993

(22) Filed: Jul. 24, 2017

(65) Prior Publication Data

US 2018/0050799 A1 Feb. 22, 2018

Related U.S. Application Data

(63) Continuation of application No. 14/461,130, filed on Aug. 15, 2014, now Pat. No. 9,715,230.

(60) Provisional application No. 61/866,478, filed on Aug. 15, 2013.

(51) Int. Cl.
| | | |
|---|---|---|
| *B64C 39/02* | (2006.01) | |
| *A63H 27/00* | (2006.01) | |
| *G05D 1/08* | (2006.01) | |
| *G05D 1/00* | (2006.01) | |
| *G05D 1/10* | (2006.01) | |

(52) U.S. Cl.
CPC .......... *B64C 39/024* (2013.01); *A63H 27/12* (2013.01); *G05D 1/0011* (2013.01); *G05D 1/0858* (2013.01); *G05D 1/102* (2013.01); *B64C 2201/108* (2013.01); *B64C 2201/12* (2013.01); *B64C 2201/146* (2013.01)

(58) Field of Classification Search
CPC .............. B64C 39/024; B64C 2201/12; B64C 2201/108; B64C 2201/146; G05D 1/102; G05D 1/0858; G05D 1/0011; A63H 27/12
USPC ...................................................... 701/2, 11
See application file for complete search history.

(56) References Cited

U.S. PATENT DOCUMENTS

| | | |
|---|---|---|
| 2007/0221780 A1 | 9/2007 | Builta |
| 2012/0232718 A1 | 9/2012 | Rischmuller et al. |
| 2013/0006448 A1 | 1/2013 | Callou et al. |
| 2014/0217229 A1 | 8/2014 | Chan |

OTHER PUBLICATIONS

Park, Sanghyuk.; "Autonomous Aerobatics on Commanded Path"; Aerospace Science and Technology, vol. 22, No. 1, pp. 64-74; Jun. 30, 2011.
PCT/US2014/051339; International Search Report and Written Opinion; dated May 28, 2015.

*Primary Examiner* — Nadeem Odeh
(74) *Attorney, Agent, or Firm* — Daryl R. Wright; Greg Carr

(57) ABSTRACT

Using a trick flight control process, a pilot may fly an aircraft while having control over two axes of orientation while the aircraft may be rotating automatically about a third axis of orientation. The pilot may continue to fly the aircraft during an automated trick rather than relinquishing control completely to the aircraft's electronics.

6 Claims, 4 Drawing Sheets

CONTROLLABLE FLIGHT DURING AUTOMATED TRICKS

CROSS-REFERENCE TO RELATED APPLICATIONS

This application relates to, and claims the benefit of the filing date of, co-pending U.S. patent application Ser. No. 14/461,130, entitled CONTROLLABLE FLIGHT DURING AUTOMATED TRICKS, filed Aug. 15, 2014, which is in turn relates to, and claims the benefit of the filing date of U.S. Provisional Application 61/866,478, entitled CONTROLLABLE FLIGHT DURING AUTOMATED TRICKS, filed Aug. 15, 2013, now abandoned, the entire contents of which are incorporated herein by reference for all purposes.

TECHNICAL FIELD

This application relates to remote control aircraft and, more particularly, to remote control aircraft tricks.

BACKGROUND

Remote control (RC) quadcopters are a type of remote control aircraft that uses four rotors to fly. Each rotor may be controlled by its own motor. A RC quadcopter is piloted by a user with a remote controller, also called a transmit controller. Radio signals from the controller control the motion of the quadcopter. A flight control processor in the quadcopter may combine radio signals from the controller with inputs from sensors on board the quadcopter to control the motion of the quadcopter. Sensors such as accelerometers, gyroscopes, and magnetometers may be used to estimate the quadcopter's position and attitude. However, magnetometers add to the cost and complexity of the quadcopter, and require calibration procedures to be performed by the user, or pilot. In addition, magnetometers are sensitive to magnetic interference, which can cause inaccurate readings and negatively affect the flight control process.

In addition to manually piloting the aircraft, some RC quadcopters permit a pilot to activate automated tricks. When a pilot activates an automated trick, the quadcopter may ignore commands from the pilot and perform a 360 degree flip, roll, or yaw rotation. When the automated trick is complete, the pilot may regain control of the quadcopter.

While automated tricks can be performed easily, the pilot is limited to selecting among the tricks offered by the quadcopter. If a pilot wishes to perform another maneuver, the automated tricks feature offers no assistance. It would be desirable if a quadcopter control system could offer the benefits of automated tricks while still permitting the pilot to remain in control of the quadcopter.

SUMMARY

Using a trick flight control process, a pilot may fly an aircraft while having control over two axes of orientation while the aircraft may be rotating automatically about a third axis of orientation. The pilot may continue to fly the aircraft during an automated trick rather than relinquishing control completely to the aircraft's electronics.

DESCRIPTION OF DRAWINGS

Reference is now made to the following Detailed Description taken in conjunction with the accompanying drawings, in which.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1:
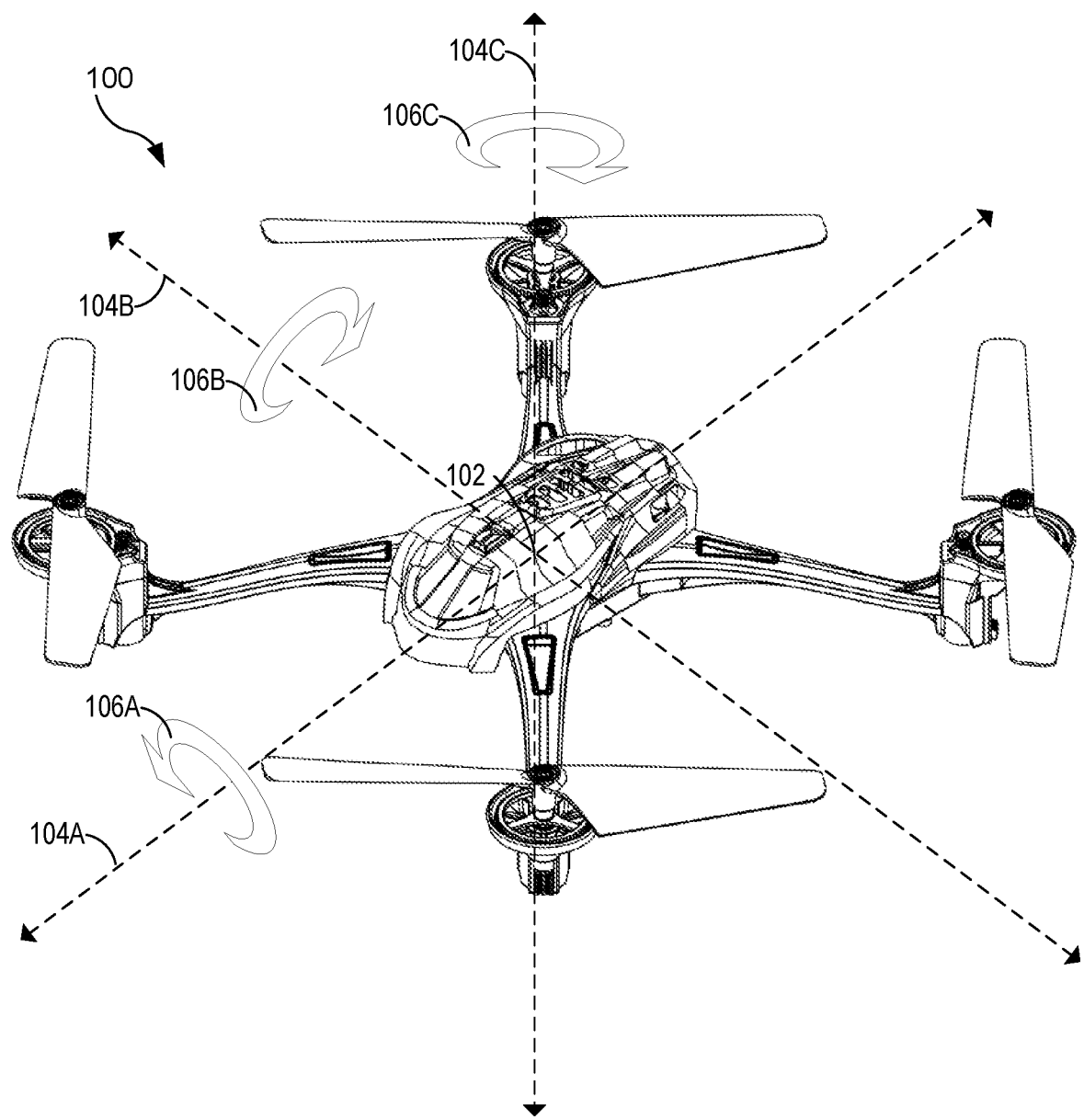
FIG. 1 is a perspective view of a quadcopter illustrating the components of aircraft attitude in accordance with an exemplary embodiment of the present invention.

The attitude of an aircraft describes its orientation. An attitude has three components: roll, pitch, and yaw. Referring to FIG. 1, depicted is a perspective view 100 of a quadcopter illustrating the three attitude components. Each attitude component is the rotation of the aircraft about one of three attitude axes passing through aircraft center of mass 102. Roll axis 104A passes through the length of the aircraft, pitch axis 104B passes through the width of the aircraft, and yaw axis 104C passes through the height of the aircraft. Roll axis 104A, pitch axis 104B, and yaw axis 104C are perpendicular to one another. Roll 106A is an amount of rotation about roll axis 106A. Pitch 106B is an amount of rotation about pitch axis 106B. Yaw 106C is an amount of rotation about yaw axis 106C.

To fly, a quadcopter requires flight control, a coordination of the activity of the rotors. Flight control is normally performed by a microprocessor on the aircraft executing a flight control process. The flight control process may be performed by flight control software. The flight control process may be a three-axis feedback control where each of the roll, pitch, and yaw angles and angular rates are controlled and the resulting response is mixed to form the commands to the motor. The flight control process may estimate a present position or attitude compared to an initial position or attitude based upon roll, pitch and yaw angles, angular rates, accelerations, speed and direction. In an instance in which the initial position is the ground, the estimated present position may include a displacement along a vertical axis, or altitude, and displacements along two perpendicular horizontal axes, which may be combined to represent a distance and direction from the initial position.

Figure 2:
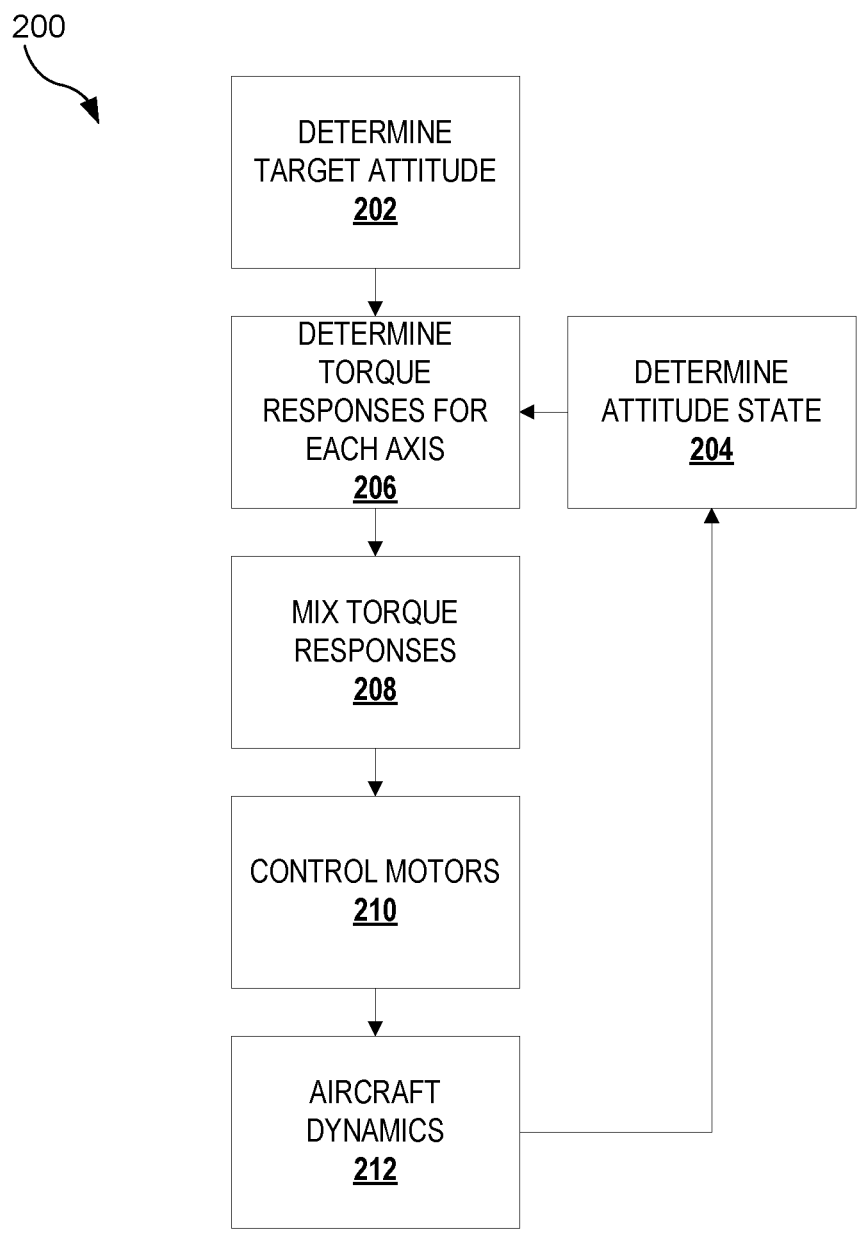
FIG. 2 shows a flight control process during normal flight.

Referring to FIG. 2, depicted is a normal flight control process 200 for flight outside of an automated trick. Flight control process 200 may be divided into a series of control periods. In each control period, flight control process 200 may read various inputs and determine what command to send to each motor for that control period.

The inputs to flight control process 200 may include two groups of inputs: "attitude state" inputs and "target attitude" inputs. Attitude state inputs may describe the aircraft's present attitude. Target attitude inputs may describe the pilot's desired target attitude for the aircraft. Each control period in flight control process 200 may begin with determining the target attitude at 202 and determining the attitude state at 204.

The target attitude inputs may include signals from a pilot's remote controller. The remote controller may send control signals to flight control process 200. At 202, flight control process 200 may receive and process these signals to determine the target attitude.

The attitude state inputs to flight control process 200 typically include sensors such as MEMS (micro-electro-mechanical systems) accelerometers for sensing linear acceleration in each of three axes, and gyroscopes for sensing rotation rates about each of three axes. At 204, flight control process 200 may use these inputs to determine a present "attitude state" for the aircraft. The contents of the attitude state may vary depending upon the sensors available to flight control process 200. In simple cases, the attitude state may include the attitude of the aircraft and the rate of change of the attitude. With more complex sensors, such as magnetometers and GPS receivers, the attitude state may include the altitude and geographic position of the aircraft. The contents of the attitude state need not necessarily be exact determinations and may be approximations developed without the use of more complex sensors.

It is well understood by a person skilled in the art that, although an accelerometer output can be used to determine the pitch and roll orientation angles, the yaw rotation angle cannot be measured by an accelerometer. Accelerometers are completely insensitive to rotations about the gravitational field vector and cannot be used to determine such a rotation. A gyroscope may sense a rotation rate, and the rotation rate may be integrated to determine an amount the aircraft has rotated about the yaw axis. Gyroscope drift may limit the accuracy of this technique. A magnetometer may be used to more accurately determine the yaw angle of the aircraft.

Therefore, at 206, flight control process 200 may subtract the target attitude determined in 202 from the attitude state determined in 204 to determine an "attitude error." From this attitude error, flight control process 200 may determine an appropriate torque response about each of the roll, pitch, and yaw axes. This determination may be performed by a proportional-integral-derivative (PID) controller.

At 208, for each motor, flight control process 200 may mix the responses for each axis to generate a motor duty cycle for the control period. The mixing may be performed by linearly combining the desired torque response about each axis for each motor.

At 210, the generated motor duty cycles may be provided to each motor. At 212, the activity of the motors, through the rotors they control, may alter the aircraft dynamics. In other words, the attitude of the aircraft may respond to the generated motor duty cycles. A new control period may then begin.

Flight control process 200, for flight control outside of an automated trick, is a conventional flight control process. One of ordinary skill may substitute variations of flight control process 200. For example, in a state estimator observer variation, the motor duty cycles generated at 208 and provided at 210 may be used in determining the attitude state at 204.

When an automated trick is activated, the aircraft may shift from flight control process 200 to a trick flight control process which performs the automated trick while still permitting the pilot to remain in control of the aircraft. The aircraft may continuously rotate about one of the attitude axes (roll, pitch, or yaw). This axis may be called the "trick axis." The trick axis may be specified by the pilot when the automated trick is activated. The aircraft may ignore pilot input with respect to the trick axis, but respond to pilot input with respect to the other two attitude axes. The pilot may then easily fly the aircraft while the aircraft rotates about the trick axis. Alternatives to ignoring pilot input with respect to the trick axis are possible and will be discussed below.

The rate at which the aircraft rotates about the trick axis may be a set angular rate, or may be an angular rate chosen by the pilot. The trick flight control process may terminate and the normal flight control process may resume after a set number of rotations, after a certain amount of time, or when commanded by the pilot.

An automated trick may be activated with a discrete command. For example, the pilot's remote controller may transmit a single discrete command to the aircraft which causes the aircraft to shift to the trick flight control process and continue to use the trick flight control process until the trick flight control process terminates.

As an illustrative example of an automated trick, while flying a quadcopter a pilot may push a button on the pilot's remote controller. Within a fixed time period after pushing the button, the pilot may select a trick axis and rotation direction by moving the control stick of the trick axis in the rotation direction. The remote controller may send a command to the quadcopter which causes the quadcopter to perform five rotations about the selected axis in the direction the pilot moved the control stick.

The quadcopter may shift to a trick flight control process that causes the quadcopter to continuously rotate about the selected trick axis. The pilot may continue to fly the quadcopter with respect to the other two axes. At the end of the fifth rotation about the trick axis, the quadcopter may shift back to its normal flight control process. The pilot may then resume flying the quadcopter normally.

In some applications, the trick flight control process may terminate as a response to a stimulus external to the aircraft, the aircraft's remote controller, and the communications between the aircraft and the remote controller. One example of such an external stimulus is an RF (radio frequency) ground beacon locating device. An aircraft may have an RF sensor and an RF ground beacon may be designated as a "target" for the aircraft. An automated trick may be invoked, causing the aircraft to rotate. The aircraft may determine when the RF sensor points toward the target. The trick flight control process may terminate in response to this target acquisition. Determining whether the RF sensor points toward the target may be performed by a software process running on the flight control microprocessor.

Figure 3:
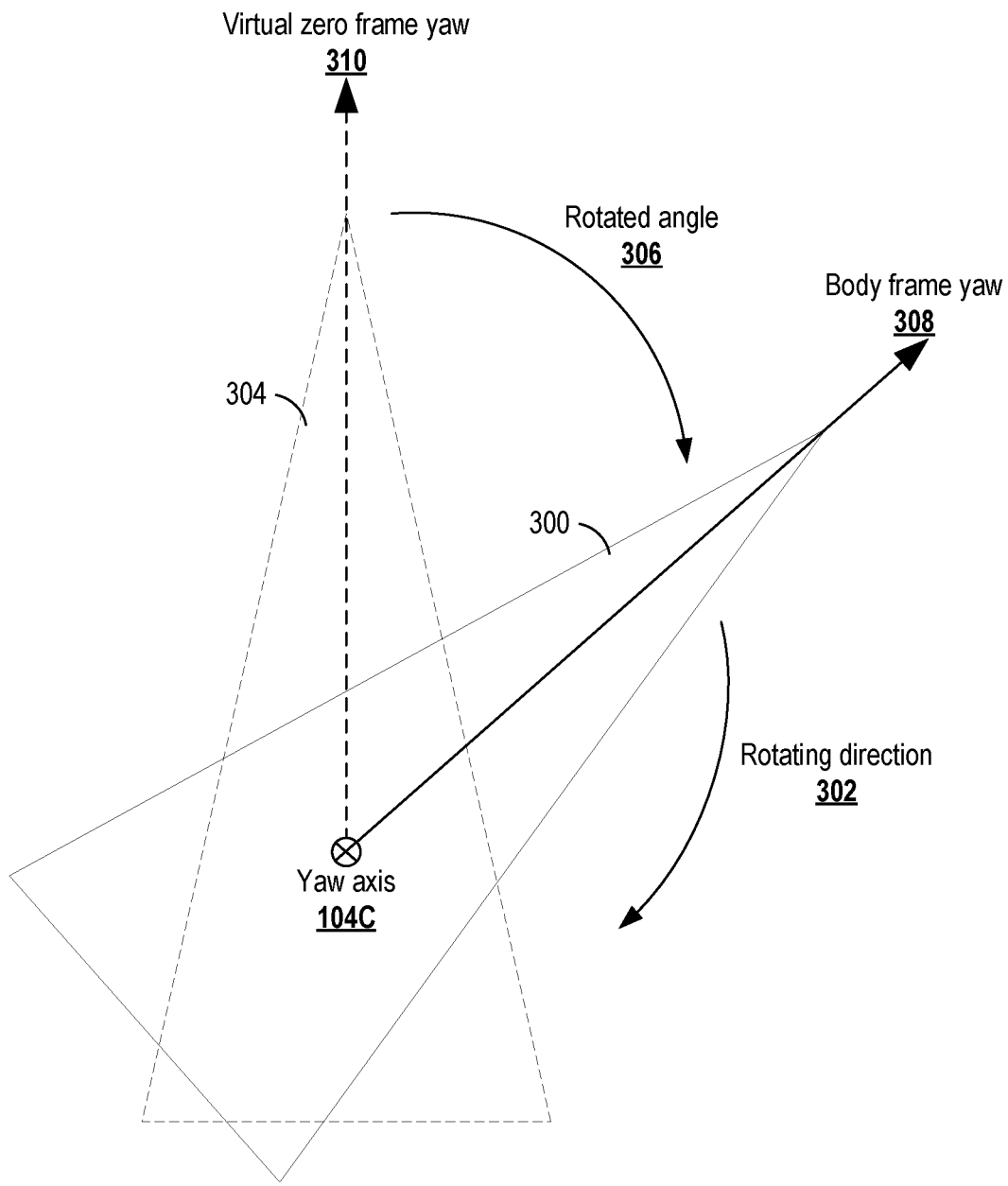
FIG. 3 shows the relationship between aircraft body attitude and "virtual zero" attitude.

For a trick flight control process to permit a user to perform automated tricks while retaining control of the aircraft, the trick flight control process may distinguish between a "virtual zero" frame of reference and a "body" frame of reference. Referring to FIG. 3, depicted is an aircraft 300 from overhead with annotations showing the relationship between virtual zero and body frames of reference. The user of aircraft 300 has begun an automated trick causing aircraft 300 to perform a yaw rotation in clockwise rotating direction 302. When the trick was activated, the aircraft yaw was original yaw 304. Aircraft 300 has since rotated through rotated angle 306 due to the automated trick. The trick flight control process may track rotated angle 306 throughout the automated trick.

The body frame of reference is the frame of reference for the airframe. In the body frame of reference, the yaw of aircraft 300 is body frame yaw 308, which takes rotated angle 306 into account. However, in the virtual zero frame of reference, rotated angle 306 does not affect the yaw because it is the result of the automated trick. In the virtual zero frame of reference, the yaw of aircraft 300 is virtual zero frame yaw 310.

Figure 4:
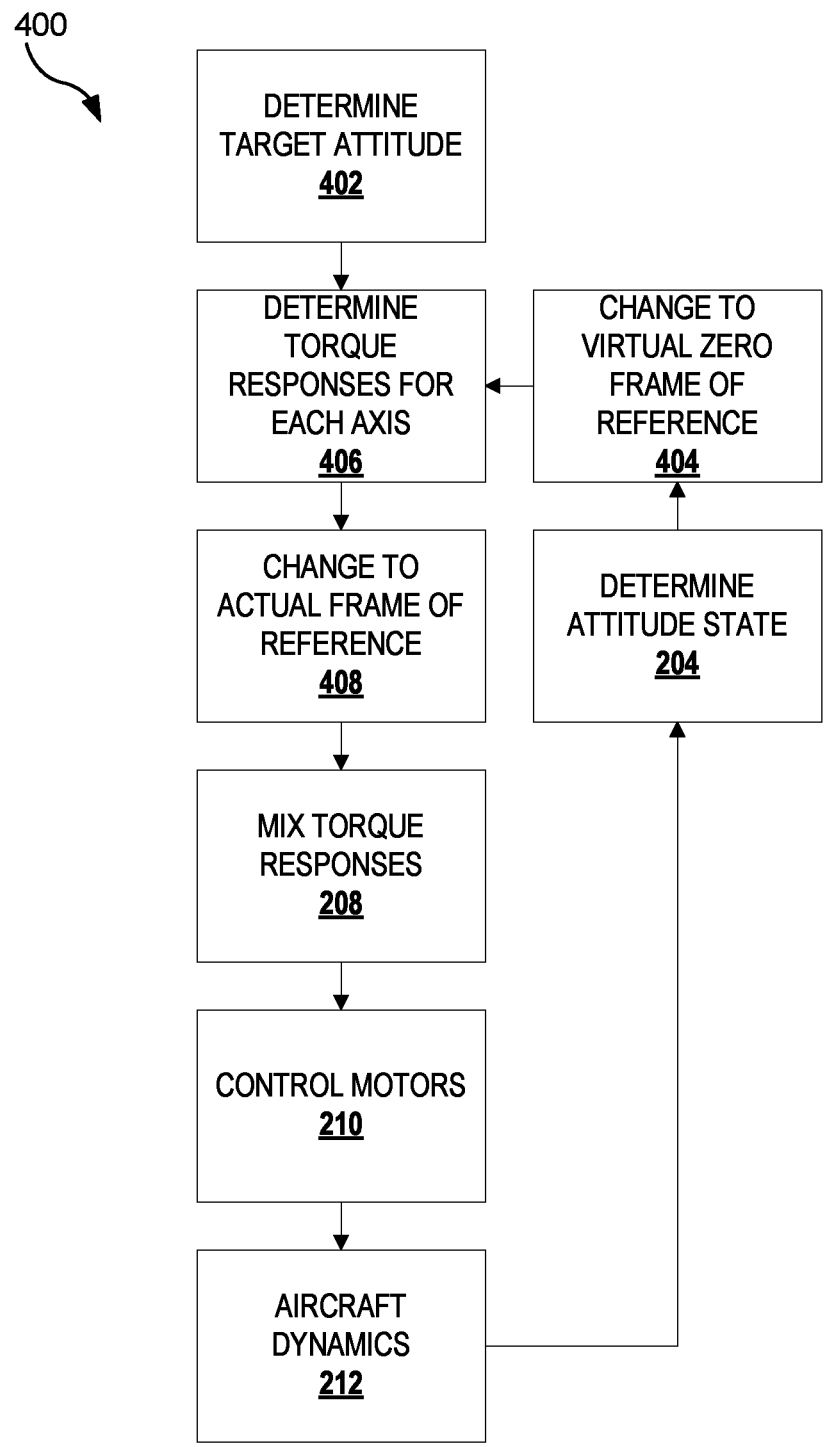
FIG. 4 shows a flight control process during an automated trick with controllable flight.

Referring to FIG. 4, depicted is a trick flight control process 400. Trick flight control process 400 includes steps 204, 208, 210, and 212 from normal flight control process 200. Trick flight control process 400 introduces new steps 402, 404, 406, and 408. Steps 402 and 406 are respectively variations of steps 202 and 206 in normal flight control process 200.

When the automated trick begins, trick flight control process 400 stores the aircraft's rotation about the trick axis as the "virtual zero" for the trick axis. For example, for the yaw rotation trick shown in FIG. 3, the virtual zero for the automated trick is virtual zero frame yaw 310, the direction of the aircraft's nose when the automated trick began.

At 402, as in 202, flight control process 400 may receive and process signals from the remote controller to determine the target attitude. An exception may be made for input for the trick axis. Input on the trick axis may be simply ignored in determining the target attitude. In a variation, input on the trick axis may be treated as a command to speed up or slow down the rotation about the trick axis. In another variation, input on the trick axis may be used in determining the target attitude, but the input may be interpreted from the virtual zero frame of reference.

When the attitude state is determined at 204, the attitude state is in terms of the body frame of reference. In other words, the rotation from the automated trick is taken into account. At 404, before the attitude state is used to determine the torque responses at 406, the attitude state is rotated into the virtual zero frame of reference. That is, the rotation from the automated trick is removed from the attitude state.

Flight control process 400 may integrate the rate of angular change about the trick axis to track the amount of rotation that has been performed during the automated trick. The angular rate of change may be determined from sensor outputs, such as gyroscope outputs. This technique may work well for short periods of time. For longer periods of time, sensor fusion may be required to track the amount of rotation and compensate for "drift" that may occur in the gyroscopes over time. Sensor fusion is a well-known method of using multiple sensors to calculate the same thing, and combining, or "fusing," the results to obtain a more accurate reading.

If the trick axis is the yaw axis and the aircraft has a magnetometer, the sensor output from the magnetometer may be "fused" with the sensor output from the gyroscope to more accurately track the amount of rotation that has been performed during the automated trick.

The duration of a trick may be limited to a certain number of revolutions about the trick axis, or may be limited to a certain amount of time. Flight control process 400 may calculate the number of revolutions completed or the amount of time the trick has been in progress. The length of a trick, whether in number of revolutions or in amount of time, may be predetermined and stored as part of flight control process 400.

It may be desirable for the trick to stop only when the aircraft has completed approximately a whole number of revolutions around the trick axis. The aircraft may then have approximately the same rotation angle about the trick axis at both the beginning and end of the trick. In an embodiment, a trick may stop only when the aircraft has completed within 10 degrees of a whole number of revolutions around the trick axis. In other words, the trick may only stop when the aircraft has completed within 350 to 370 degrees of rotation around the trick axis, 710 to 730 degrees of rotation around the trick axis, 1070 to 1090 degrees of rotation around the trick axis, and so on.

Where the duration of a trick depends on accurately measuring the amount of rotation around the trick axis, drift in the gyroscopes may limit the duration of the trick. The duration of the trick may be limited to while the drift in the gyroscopes remains within an acceptable margin of error. In an embodiment, a trick may last for five revolutions around the trick axis before stopping.

At 406, as in 206 in the normal flight control process, flight control process 400 may subtract the target attitude from the attitude state to determine the attitude error. However, because the target attitude is provided in the virtual zero frame of reference, the rotation from the automated trick is not considered in determining the attitude error from the pilot's target attitude. Consequently, the rotation from the automated trick is not considered in determining the torque responses for each axis. Instead, flight control process 400 may determine torque responses that produce a fixed rate of rotation on the trick axis. At 408, the torque responses for each axis are rotated back into the body frame of reference before being mixed at 208.

With trick flight control process 400, the pilot may fly the aircraft in the two non-trick axes in reference to the virtual zero about the trick axis, even though the aircraft is rotating about the trick axis. For example, for a yaw rotation automated trick, the pilot may fly the aircraft in pitch and roll in terms of a virtual zero in yaw, even though the aircraft is continuously rotating about the yaw axis. The resulting maneuver may be very difficult to perform with full manual control over the aircraft; for example, a pilot with full manual control over the aircraft may be required to continuously correct the attitude with roll and pitch inputs while the aircraft is rotating about the yaw axis. The trick flight control process 400 may permit the maneuver to be performed easily. Unlike conventional automated tricks, however, the pilot continues to fly the aircraft during the automated trick rather than relinquishing control completely to the aircraft's electronics. The pilot may continue to fly at the same altitude and in the same direction, or may alter direction or altitude at will during execution of the trick.

For a pilot that flies remote control aircraft for the enjoyment of flying, trick flight control process 400 permits the pilot to retain control. At the same time, trick flight control process 400 assists the pilot in performing an automated trick. The pilot may incorporate the automated trick rotation action into the pilot's own maneuvers, developing complex tricks.

During trick flight control process 400, the pilot may retain control of the two non-trick attitude components. The pilot may also have control of the angular rate of change about the trick axis. Alternately, the angular rate of change about the trick axis may be predetermined and stored as part of flight control process 400.

The automated trick rotation couples the actions about the other non-trick axes. This changes the dynamics of the system, introducing new poles and zeroes. In other words, the motor commands do not instantly affect the aircraft's attitude. There may be slight delay until the motor RPM matches the command. If the controller at 406 determines motor commands appropriate for the current orientation, the delay may cause the commands for rotating about the trick axis to impact the aircraft's rotation about the other two non-trick axes. To avoid instability, the rotational rate for automated trick rotation may be limited. Alternately, a more complex controller at 406, such as a state feedback controller, or a more complex mixer at 408 may be used.

Before terminating trick flight control process 400, it may be preferable to cause the aircraft rotation about the trick axis in the body frame of reference to return to the rotation in the virtual zero frame of reference. The aircraft may continue to respond to pilot commands in the non-trick axes while returning the rotation about the trick axis in the body frame of reference to the virtual zero rotation. This rotation should preferably not take too long, so that the pilot does not become frustrated from lack of control.

While the above discussion was primarily with reference to quadcopters, controllable flight during automated tricks is applicable to other types of aircraft. The above disclosure may be used on other types of helicopters, including tricopters, and on airplanes. On airplanes, due to the mechanics of airplane flight, the yaw axis may be unsuitable as the trick axis while the roll axis may be particularly suited as the trick axis.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

We claim:

1. A method for providing user control of a remote control aircraft during an automated trick, the method comprising:
   receiving a command to perform the automated trick;
   rotating the aircraft about a trick axis by a trick rotation amount in response to the command to perform the automated trick;
   determining a body attitude of the aircraft;
   determining a virtual zero attitude of the aircraft that comprises the body attitude with the trick rotation amount removed;
   determining a target attitude while the aircraft performs the automated trick, the target attitude comprising a desired attitude for the aircraft input by a pilot;
   determining an attitude error that comprises a difference between the target attitude and the virtual zero attitude;
   determining one or more torque responses during performance of the automated trick;
   controlling one or more motors of the aircraft in accordance with the one or more torque responses;
   terminating the automated trick based upon an external stimulus; and
   wherein the controlling of the one or more motors of the aircraft comprises:
      controlling the aircraft to correct at least a portion of the attitude error; and
      performing at least a portion of the automated trick such that one or more of the trick axis, a trick rotation direction, and a trick rotation rate, cause differences between the body attitude and the desired attitude.

2. The method of claim 1, wherein the external stimulus is a position of a Radio Frequency (RF) beacon relative to the aircraft.

3. A remote control aircraft for providing user control of the aircraft during an automated trick, the aircraft comprising a flight control microprocessor configured to:
   receive a command to perform the automated trick;
   rotate the aircraft about a trick axis by a trick rotation amount in response to the command to perform the automated trick;
   determine a body attitude of the aircraft;
   determine a virtual zero attitude of the aircraft comprising the body attitude with the trick rotation amount removed;
   determine a target attitude while the aircraft performs the automated trick, the target attitude comprising a desired attitude for the aircraft input by a pilot;
   determine an attitude error comprising a difference between the target attitude and the virtual zero attitude;
   determine one or more torque responses during performance of the automated trick;
   terminate the automated trick based upon an external stimulus;
   control one or more motors of the aircraft in accordance with the one or more torque responses; and
   wherein the control of the one or more motors of the aircraft comprises:
      controlling the aircraft to correct at least a portion of the attitude error; and
      performing at least a portion of the automated trick such that one or more of the trick axis, a trick rotation direction, and a trick rotation rate cause differences between the body attitude and the desired attitude.

4. The remote control aircraft of claim 3, wherein the external stimulus is a position of a Radio Frequency (RF) beacon relative to the aircraft.

5. A method for providing user control of a remote control aircraft during an automated trick, the method comprising:
   receiving a command to perform the automated trick;
   automatically rotating the aircraft about a trick axis at a rate of rotation in response to the command to perform the automated trick;
   terminating the automated trick by an external stimulus;
   wherein the aircraft responds to an input made by a pilot while the aircraft performs the automatic trick; and
   wherein the response to the pilot input comprises changing a radius of turn of the aircraft without changing the rate of rotation of the aircraft about the trick axis.

6. The method of claim 5, wherein the external stimulus is a position of a Radio Frequency (RF) beacon relative to the aircraft.

* * * * *